United States Patent
Rea et al.

(10) Patent No.: US 6,477,253 B1
(45) Date of Patent: Nov. 5, 2002

(54) METHOD AND APPARATUS FOR TELEVISION SIGNAL SCRAMBLING USING VERTICAL SYNC REPLACEMENT

(75) Inventors: Timothy D. Rea, Quakertown; Alfred W. Stufflet, Norristown, both of PA (US); Kevin T. Chang, Neshanic Station, NJ (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/229,685

(22) Filed: Jan. 13, 1999

(51) Int. Cl.[7] .................................................. H04N 11/14
(52) U.S. Cl. ........................ 380/221; 380/200; 380/210
(58) Field of Search ................................. 380/200, 201, 380/204, 210, 221

(56) References Cited

U.S. PATENT DOCUMENTS 4,100,575 A * 7/1978 Morio et al. .................... 380/5
4,618,888 A * 10/1986 Nohara et al. ................. 380/15
6,295,360 B1 * 9/2001 Ryan et al. .................... 380/54

* cited by examiner

Primary Examiner—Ly V. Hua
(74) Attorney, Agent, or Firm—Rader, Fishman & Grauer PLLC

(57) ABSTRACT

A method and device for scrambling video signals for broadcast in a proprietary television system includes modifying the vertical or horizontal synchronization pulses of the video signal to prevent unauthorized viewers from properly displaying the programming content. Preferably, the vertical sync pulses are removed from the signal prior to broadcast and replaced with horizontal sync pulses. A descrambler used with the receiving television uses the manner in which the false horizontal sync pulses were inserted into the video signal to recreate a sufficient approximation of the vertical sync pulses.

15 Claims, 2 Drawing Sheets

METHOD AND APPARATUS FOR TELEVISION SIGNAL SCRAMBLING USING VERTICAL SYNC REPLACEMENT

FIELD OF THE INVENTION

The present invention relates to the field of audio-visual signal transmission and reception. More particularly, the present invention relates to a method and apparatus for scrambling an audio-visual signal during transmission in order to control reception and use of the signal.

BACKGROUND OF THE INVENTION

Cable and pay-per-view television programming are extremely popular and widely available around the globe in modern society. Those firms providing such programming are frequently lucrative and successful. This success comes, in part, from the ability to prevent those who have not purchased the service from receiving and using the television signals transmitted by the service provider.

In general, it is common for a cable company or other service provider to scramble its signals to prevent their use by unauthorized parties. This scrambling is intended to make the signals unintelligible to typical television sets which are not authorized to receive and use the scrambled signal. When the signal is scrambled, a conventional television will not recognize the signal, or at best, display only a distorted image from the signal.

Cable companies which provide a number of channels over a cable connection may only scramble certain channels so that cable subscribers can be required to pay additional fees for receiving these "premium" channels. The premium channels are typically movie or adult channels.

Those subscribers who have paid the service provider for reception of the scrambled signal will be given equipment for use with their television sets which unscrambles the signal. With this equipment, the authorized user can unscramble and receive the service provider's signals and view the programming contained in the transmission.

A well-known conventional method of scrambling a signal to prevent its unauthorized reception is to reverse the spectral positions of the audio and video portions of the signal. Typically, an audio-visual signal will have an audio carrier signal at a first frequency and a video carrier signal at a second frequency. The carrier signals are modulated to carry the respective video and audio data of the transmitted programming.

If, however, the audio carrier signal is transmitted at the second (video carrier) frequency, and the video carrier signal is transmitted at the first (audio carrier) frequency, the signal is scrambled. A television tuner will be attempting to receive the audio signal at the first frequency and the video signal at the second frequency, and will be unable to receive the reversed signal properly.

Many other methods of scrambling audio-visual signals during transmission are known in the art. However, all are subject to various deficiencies. For example, many scrambling methods are only partially effective. Thus, while the scrambled signal is not received clearly, the image and audio may still be intelligible.

Accordingly, there is a need in the art for an improved and more effective means and method of scrambling an audio-visual signal.

SUMMARY OF THE INVENTION

It is an object of the present invention to meet the above-described needs and others. Specifically, it is an object of the present invention to provide a method and apparatus for scrambling an audio-visual signal and for receiving and unscrambling the scrambled signal that is highly effective.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied as a method of controlling access to a broadcast video signal by scrambling the video signal by modifying at least one of the horizontal or vertical sync component of the video signal so as to render the signal unstable when received by a conventional television set.

Preferably, the method of the present invention includes modifying the vertical sync component of the video signal by removing the vertical sync component from the video signal entirely. This replacement is illustrated in FIG. 3. Following removal of the vertical sync component, the method of the present invention includes inserting the horizontal sync component in the video signal in place of the removed vertical sync component. A final step in the scrambling process is the insertion of the vertical blanking interval (VBI) scramble mode data. The scrambled signal may then be broadcast.

The method of the present invention also encompasses the process of unscrambling the scrambled video signal by receiving the video signal with the modified vertical sync component; synchronizing to and receiving VBI scramble mode data; and reconstructing the vertical sync component. The method concludes by inserting the recreated vertical sync component into the received video signal so that the received video signal may be properly displayed by a television set.

The present invention also encompasses a scrambler for scrambling a video signal under the principles of the present invention. The scrambler of the present invention includes: an input terminal for receiving a video signal; and a signal conditioner which receives the video signal from the input terminal and removes therefrom the vertical sync component of the video signal.

The scrambler of the present invention further includes a sync processor that first extracts the horizontal and vertical sync component for synchronization to incoming video and then inserts horizontal sync components in the VBI. A multiplexer receives an output signal from the signal conditioner, the horizontal sync component from the sync processor, and scramble mode data from the data inserter. The multiplexer then inserts the horizontal sync component in the video signal in place of the extracted vertical sync component. A control logic circuit controls the operation of the multiplexer, the sync processor and the data inserter.

Finally, the scrambler of the present invention preferably includes an amplifier for receiving the scrambled video signal from the multiplexer and outputting the scrambled video signal through an output terminal.

Finally, the present invention also encompasses a descrambler for unscrambling a scrambled video signal which has been scrambled according to the principles of the present invention by inserting a horizontal sync signal component in place of the vertical sync signal component. The descrambler of the present invention includes: an input terminal for receiving the scrambled video signal; a scramble mode data receiver that is used to lock to the scramble mode data in the incoming video signal; a control logic circuit for controlling the timing and multiplexing in the descrambler; a vertical sync generator controlled by the control logic circuit for generating the vertical sync component based on the output of the signal processor as provided to the control logic circuit; and a multiplexer, controlled by the control logic circuit, for receiving the scrambled video signal from the input terminal, receiving the vertical sync component from the vertical sync generator, and inserting the vertical sync component into the scrambled video signal so as to produce an descrambled video signal.

Preferably, the descrambler of the present invention also includes an output terminal for receiving the unscrambled video signal from the multiplexer and providing the unscrambled video signal to a television set. The unscrambled video signal can then be properly displayed on a conventional television set with the television able to stabilize the picture vertically and horizontally.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

When an audio-visual television signal is broadcast to viewers, the signal contains vertical and horizontal synchronization information in the form of sync pulses. This information is essential for the receiving television set to properly display the signal being received. For example, the receiving television set uses the vertical and horizontal information in the television signal to separate successive frames of the program being received and to display each frame properly with respect to the horizontal and vertical dimensions of the television screen.

Most conventional television sets have vertical and horizontal hold controls that can be used to calibrate, if necessary, the television's use of the vertical and horizontal sync pulses in the received signal. Without this calibration, the picture displayed on the television set may be improperly displaced horizontally or vertically, or may not even be stable at all.

Under the principles of the present invention, a television signal can be scrambled by modifying the vertical and/or horizontal sync pulses in a broadcast television signal. Such modifications, if done properly, can prevent a receiving television for obtaining the necessary sync lock on the signal which is essential to a proper display of the signal.

More specifically, in a preferred embodiment, the present invention provides an improved method of scrambling audio-visual television signals by removing entirely the vertical sync information from the signal as transmitted. This causes a television receiving the scrambled signal to be unable to vertically stabilize the picture displayed. Consequently, the picture will continuously roll vertically so as to be useless to a viewer who does not have the proper descrambling device.

The method of scrambling provided by the present invention may be used alone, or may be used in conjunction with another scrambling method to further mask the scrambled signal and prevent its unauthorized use. A specific example of the present invention in implementation is provided in the accompanying figures.

Figure 1:
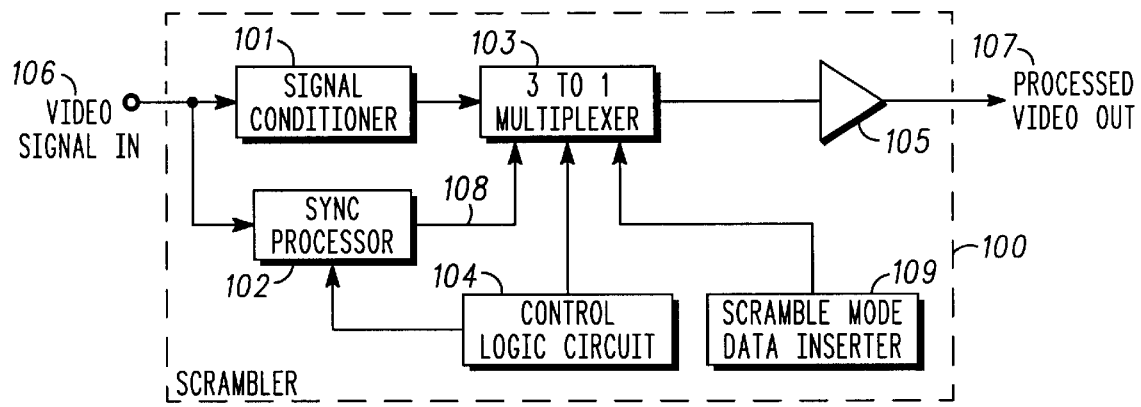
FIG. 1 is block diagram showing a scrambler for scrambling an audio-visual signal according to the principles of the present invention.

As shown in FIG. 1, a scrambler 100 according the principles of the present invention may be constructed as follows. The scrambler 100 includes a terminal 106 into which an unscrambled video signal is provided. The terminal 106 provides the incoming video signal to both a signal conditioner 101 and a sync processor 102.

The signal conditioner 101 is used to stabilize the DC position and size of the incoming signal. The sync processor 102 generates a horizontal sync signal under the control of a control logic circuit 104. These horizontal sync pulses 108 are then provided to the multiplexer 103.

Figure 3:
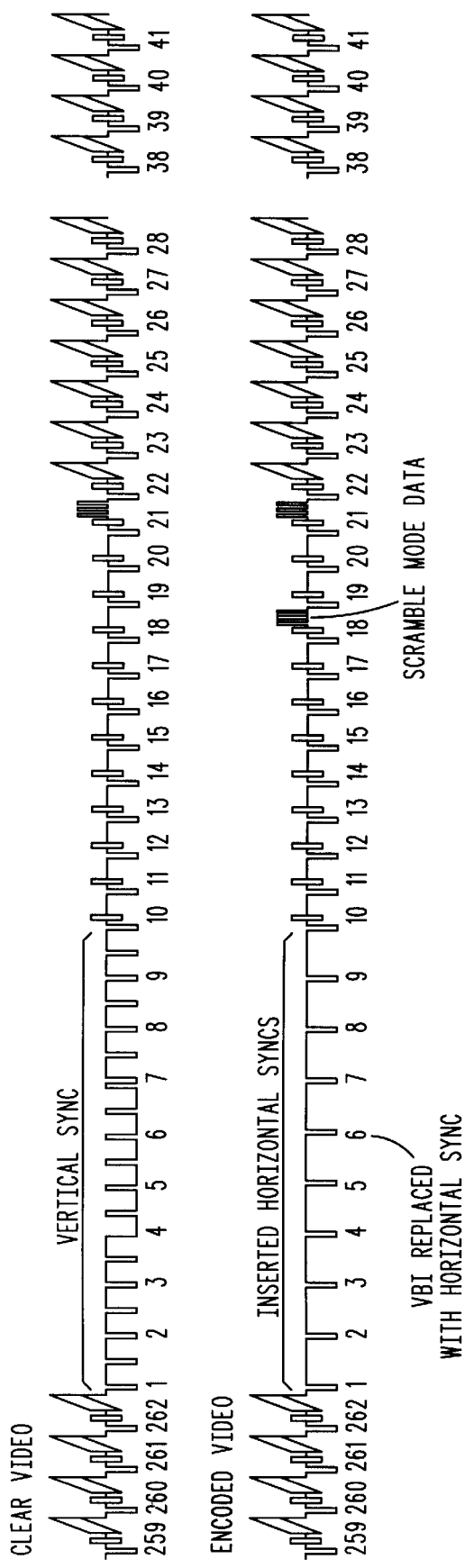
FIG. 3 is a waveform diagram comparing a clear video signal and a video signal encoded according to the principles of the present invention.

The multiplexer 103, under the control of the control logic circuit 104, removes the vertical sync pulses from the signal output by the signal conditioner 101. The multiplexer 103 then inserts the horizontal sync pulses 108 from the sync processor 102 into the signal from the signal conditioner 101. These horizontal sync pulses 108 are multiplexed into the signal from the conditioner 101 in the signal interval from which the vertical sync pulses were removed. This is illustrated in FIG. 3.

The multiplexer 103 also receives a scramble mode data signal from a scramble mode data inserter 109. This scramble mode data signal is also added by the multiplexer 103 to the signal from the conditioner 101.

The resulting scrambled video signal is output through an amplifier 105 to a processed video out terminal 107. The signal is then ready for broadcast. Any unauthorized television set seeking to receive the scrambled signal will be unable to obtain vertical sync lock, and the received picture will continuously roll vertically, thereby masking the program content.

Figure 2:
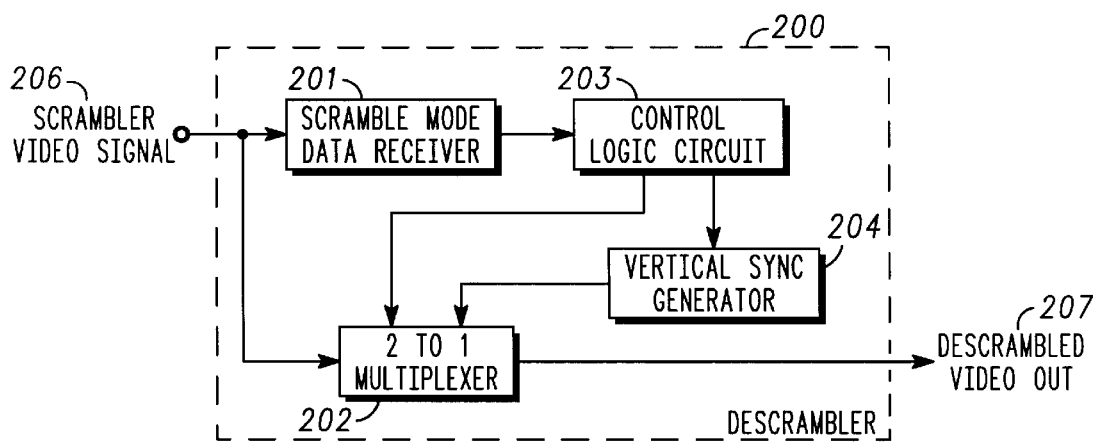
FIG. 2 is a block diagram showing a descrambler for unscrambling an audio-visual signal according to the principles of the present invention.

FIG. 2 illustrates a descrambler 200 according to the principles of the present invention by which the signal processed by the scrambler 100 can be unscrambled for proper display on a television set. As shown in FIG. 2, the descrambler 200 includes a terminal 206 through which the scrambled video signal is received.

The scrambled video signal from terminal 206 is provided to a signal processor 201 and a multiplexer 202. The signal processor 201 is a scramble mode data receiver and extracts the scramble mode data from the signal 206.

The control logic circuit 203 is the counterpart of the control logic circuit 104 in FIG. 1. Based on the manner in which the control logic circuit 104 controlled the insertion of the horizontal sync pulses to the scrambled signal, the control logic circuit 203 can determine the parameters of the missing vertical sync pulses which were extracted by the multiplexer 103.

Using the scramble mode data extracted by the signal processor 201, the control logic circuit 203 controls a vertical sync generator 204 to recreate a sufficient approximation of the missing vertical sync pulses. The recreated vertical sync pulses are provided from the generator 204 to the multiplexer 202. The multiplexer 202, under the control of the control logic circuit 203, inserts the recreated vertical sync pulses from the generator 204 into the scrambled signal received through terminal 206.

The multiplexer 202 then outputs a descrambled video signal through output terminal 207. This descrambled signal may be used by any conventional television and will allow such a television to obtain the proper vertical synchronization to vertically stabilize the reception.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of controlling access to a broadcast video signal by scrambling said video signal, said method comprising modifying a horizontal sync component of said video signal.

2. A method of controlling access to a broadcast video signal by scrambling said video signal, said method comprising:

removing a vertical sync component from said video signal; and inserting a horizontal sync signal in said video signal in place of said removed vertical sync component to produce a modified video signal, said inserted signal excluding any data regarding said scrambling.

3. A method as claimed in claim 2, further comprising inserting scramble mode data in said video signal at a portion of said video signal other than where said vertical sync component has been removed.

4. A method as claimed in claim 3, wherein said inserting scramble mode data in said video signal further comprises inserting said scramble mode data at an 18th line of said video signal.

5. A method as claimed in claim 2, further comprising:

receiving said modified video signal;

removing from said modified video signal said inserted horizontal sync component; and recreating said vertical sync component based on said removed horizontal sync component.

6. A method as claimed in claim 5, further comprising inserting said recreated vertical sync component into said received video signal so that said received video signal may be properly displayed by a television set.

7. A scrambler for scrambling a video signal comprising:

an input terminal for receiving a video signal;

a signal conditioner which receives said video signal from said input terminal and removes therefrom a vertical sync component of said video signal a sync processor which receives said video signal from said input terminal and synchronizes with said video signal to generate a horizontal sync component; and a multiplexer which receives an output signal from said signal conditioner and said horizontal sync component from said sync processor;

wherein said multiplexer inserts said horizontal sync component in said video signal in place of said extracted vertical sync component; and wherein said scrambler does not insert data regarding said scrambling in that portion of said video signal from which said vertical sync component was removed.

8. A scrambler as claimed in claim 7, further comprising a scramble mode data inserter which provides a scramble mode data signal to said multiplexer, wherein said multiplexer multiplexes said scramble mode data signal from said scramble mode data inserter into said video signal at a portion of said video signal other than where that portion for which said vertical sync component was removed.

9. A scrambler as claimed in claim 7, further comprising a control logic circuit for controlling said multiplexer and said sync processor.

10. A scrambler as claimed in claim 7, further comprising an amplifier for receiving a scrambled video signal from said multiplexer and outputting said scrambled video signal through an output terminal.

11. A descrambler for unscrambling a scrambled video signal which has been scrambled by inserting a horizontal sync signal component in place of a vertical sync signal component, said descrambler comprising:

an input terminal for receiving said scrambled video signal;

a scramble mode data receiver for extracting scramble mode data from said scrambled video signal;

a control logic circuit;

a vertical sync generator controlled by said control logic circuit for generating a vertical sync component based on said extracted scramble mode data output by said scramble mode data receiver; and a multiplexer, controlled by said control logic circuit, for receiving said scrambled video signal from said input terminal, receiving said vertical sync component from said vertical sync generator, and inserting said vertical sync component into said scrambled video signal so as to produce an unscrambled video signal.

12. A descrambler as claimed in claim 11, further comprising an output terminal for receiving said unscrambled video signal from said multiplexer and providing said unscrambled video signal to a television set.

13. A method of descrambling a video signal that has been scrambled by a process including inserting a horizontal sync signal component in place of a vertical sync signal component and inserting scramble mode data at a portion of said video signal other than where said vertical sync signal was replaced, said method comprising:

extracting said scramble mode data;

generating a vertical sync signal based on said extracted scramble mode data; and inserting said generated vertical sync signal in said video signal so as to produce an unscrambled video signal.

14. The method of claim 13, further comprising inserting said scramble mode data in an 18th line of said video signal.

15. The method of claim 13, further comprising outputting said unscrambled video signal to a television set.

* * * * *

UNITED STATES PATENT AND TRADEMARK OFFICE
CERTIFICATE OF CORRECTION

PATENT NO.     : 6,477,253 B1
DATED          : November 5, 2002
INVENTOR(S)    : Timothy D. Rea It is certified that error appears in the above-identified patent and that said Letters Patent is hereby corrected as shown below:

Column 3,
Line 61, replace "for" with -- from --.

Signed and Sealed this

Twenty-fifth Day of February, 2003

JAMES E. ROGAN
*Director of the United States Patent and Trademark Office*